United States Patent [19]

Webb

[11] 4,185,515

[45] Jan. 29, 1980

[54] MOTION TRANSMITTING REMOTE CONTROL ASSEMBLY

[75] Inventor: Grant A. Webb, Northville, Mich.

[73] Assignee: Teleflex Incorporated, Limerick, Pa.

[21] Appl. No.: 514,015

[22] Filed: Oct. 11, 1974

[51] Int. Cl.$^2$ .......................... F16C 1/10; F16B 7/08; B25G 3/00; B65D 7/48

[52] U.S. Cl. .................. 74/501 P; 403/243; 403/188; 16/2

[58] Field of Search ............. 74/501 P; 403/243, 188; 16/2; 24/73 P, 73 AP, 73 PF, 73 MF; 248/74 A; 85/5 R

[56] References Cited

U.S. PATENT DOCUMENTS

| | | | |
|---|---|---|---|
| 3,093,874 | 6/1963 | Rapata | 85/5 R X |
| 3,154,281 | 2/1962 | Frank | 24/73 AP |
| 3,426,613 | 2/1969 | Conrad | 74/501 P |
| 3,693,494 | 9/1972 | Meyer | 85/5 R |
| 3,776,092 | 12/1973 | Seckerson | 85/5 R |

FOREIGN PATENT DOCUMENTS

| | | | |
|---|---|---|---|
| 104124 | 4/1964 | Norway | 24/73AP |
| 959039 | 5/1964 | United Kingdom | 24/73 AP |

Primary Examiner—C. J. Husar
Assistant Examiner—Frank McKenzie
Attorney, Agent, or Firm—McGlynn and Milton

[57] ABSTRACT

A motion transmitting remote control assembly of the type for transmitting motion in a curved path by a flexible motion transmitting a core element movably supported by a guide such as a conduit. The assembly includes connection means for connecting either or both the conduit to a support structure and the core element to a control element. The connector means includes a snap-in connector for snap-in retention in an opening and is defined by a body for disposition on one side of the opening and a head for insertion through and retention in the opening. The head includes a first leg integral with and extending outwardly from the body to an outward end and a second leg extending generally inwardly from the outward end of the first leg to a distal end. The legs are spaced apart from one another whereby the second leg may be flexed or moved toward the first leg. The head is actually frusto-conical in its outer surface with a semi-spherical top with a slot extending therethrough to define the first and second legs. A shoulder extends about the head whereby there is defined a shoulder on the first leg which faces the body and is in spaced relationship thereto. The distal end of the second leg defines a shoulder spaced from the body the same distance as the shoulder defined on the first leg. Also included is an annular base extending upwardly from the body to the shoulder on the first leg and to a position immediately adjacent the distal end of the second leg.

14 Claims, 4 Drawing Figures

MOTION TRANSMITTING REMOTE CONTROL ASSEMBLY

This invention relates to a motion transmitting remote control assembly of the type for transmitting motion in a curved path by a flexible motion transmitting core element slidably disposed within a guide such as a conduit. More specifically, the invention relates to such a remote control assembly including a connection means for connecting the conduit of the guide and/or the core element to support structure and control elements respectively.

Typical of such a connection means known in the prior art is that shown in U.S. Pat. No. 3,398,600 to White et al wherein there is disclosed a snap-in connector attached to the core element of a motion transmitting core element for connecting the core element to a control element. The problem with many of the prior art snap-in connectors, such as that shown in the White et al patent, is that they employ two spaced-apart tangs which flex toward one another as the connector is snapped into an opening and such a configuration requires a void or lack of material between the two tangs in the area in which forces will be applied to the connector when inserted in the opening. Thus, there is a limit to the size of such a connector because very small connectors will not have the requisite strength characteristics.

The subject invention provides a snap-in connector for use with a motion transmitting remote control assembly which can be made in very small sizes as it includes a body portion having one leg integral therewith and extending upwardly to be connected to a downwardly extending second leg which flexes toward the first leg as the connector is being snapped into an opening, such a configuration providing much more strength in shear, as there is a full section of material disposed in the opening.

Fasteners of a similar configuration have been known to the prior art, an example of one such fastener being shown in the U.S. Patent to Meyer U.S. Pat. No. 3,693,494. The fastener disclosed therein is utilized for retaining two sheet-like members together and includes a bowed flexible head with one leg extending outwardly from the head and another leg extending downwardly from the first leg. A shoulder is disposed upon the legs in spaced relationship to the head. However, the free leg remains in the aperture and does not attain freedom from the aperture in which it is disposed whereby the fastener may be easily removed from the opening in which it is disposed. Additionally, there is no full section in the aperture to take shear loads.

The instant invention is an improvement over such fasteners in that the flexible leg defines a shoulder at its distal end whereby it snaps free of any opening in which it is disposed thereby making it very difficult to remove the connector from an opening and includes a full shear base portion for receiving shear loads thereby enabling the connector to be of a minimal size.

Other advantages of the present invention will be readily appreciated as the same becomes better understood by reference to the following detailed description when considered in connection with the accompanying drawings wherein.

Referring now to the drawings where like numerals indicate like or corresponding parts throughout the several views, a motion transmitting remote control assembly constructed in accordance with the instant invention is generally shown at 10.

Figure 1:
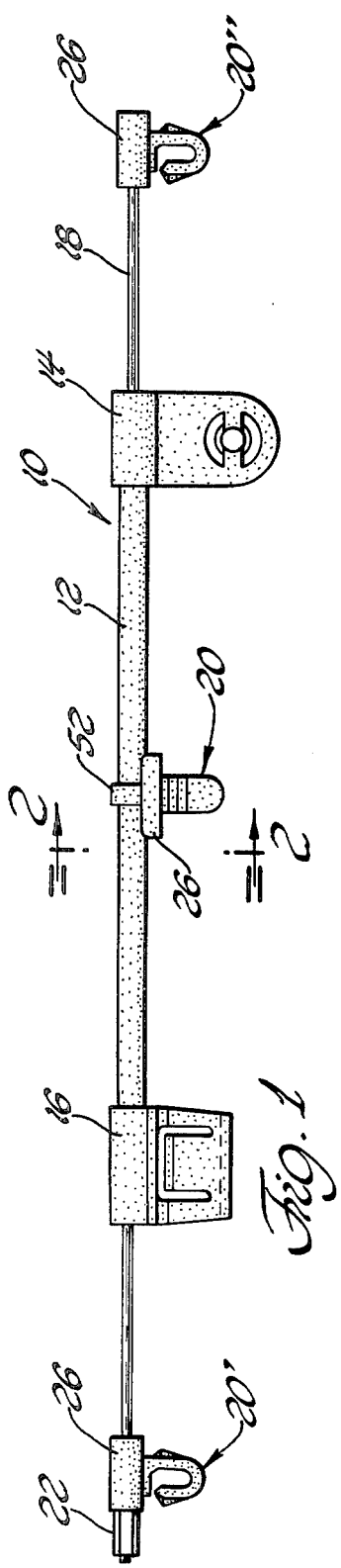
FIG. 1 is a side elevational view of a motion tranmitting remote control assembly constructed in accordance with the instant invention.

The motion transmitting remote control assembly includes a guide defined by a conduit 12. The conduit 12 is preferably of the well known type including an inner tubular plastic member surrounded by a sheath of long lay wires or woven wire or plastic fibers which are in turn encased in a plastic casing. Fittings or connectors 14 and 16 are preferably made of plastic and molded about the ends of the conduit 12 and are adapted for connecting the conduit to support structure. The fittings 14 and 16 may be of various types including the type to be described hereinafter.

The control assembly 10 also includes a flexible motion transmitting core element 18 movably supported by the conduit 12. The core element 18 is preferably a wire-like member which transmits tension and compression forces as it is moved to and fro within the conduit 12.

The motion transmitting remote control assembly 10 also includes connection means for connecting the conduit 12 and/or the core element 18 to support structure and control elements respectively. In other words, the connection means may be utilized for connecting the conduit to a support structure or may be utilized for connecting the core element 18 to one or more control elements. The connection means comprises an integral snap-in connector, three embodiments of which are generally shown at 20, 20' and 20" respectively. The three embodiments 20, 20' and 20" differ only in the manner in which they are attached to the conduit 12 or the core element 18. As will become more clear hereinafter, the snap-in connector 20 is snapped into releasable engagement with the conduit 12. The snap-in connector 20' is slidably disposed on the core element 18 and is retained thereon by a metallic slug 22 welded or otherwise secured to the core element 18. The snap-in connector 20" is molded about an irregularity in the core element 18 so as to be retained thereon. Thus, the snap-in connector 20 is exemplary of all three embodiments and will be described in detail. The integral snap-in connector 20 is adapted for snap-in retention in an opening 24. The snap-in connector is an integral one piece plastic member including a body 26 for disposition on one side of the opening 24 and against a face 28 of a member 30 in which the hole 24 is disposed.

The snap-in connector 20 also includes a head generally indicated at 32 for insertion through and retention in the opening 24. The head is frusto-conical in that the outer surfaces 34 form a part of a cone and the top of the head 36 is semi-spherical. The head 32 has a slot 38 extending therethrough with a portion 40 extending laterally whereby the head 32 includes a first leg 42 extending outwardly from the body 26 to an outward end defined by the spherical portion 36 of the head and a second leg 44 extending generally inwardly from the outward end of the first leg 42 to a distal end 46 which is spaced from the remainder of the connector by the narrow portion of the slot 40. The legs 42 and 44 are spaced from one another and the leg 44 is cantilevered in a downward direction whereby it may be flexed and moved inwardly toward the leg 42 as the connector is snapped into the opening 24.

The bottom of the frusto-conical surfaces 34 is defined by an annullar shoulder which includes a shoulder 48 facing the body 26 and disposed in spaced relationship thereto. The remaining portion of the annular shoulder is defined by the distal end 46 of the leg 44 which is also spaced from the body 26 substantially the same distance as the shoulder 48.

Also included is an annular or circular base 50 extending upwardly from the body 26. The base extends upwardly from the body 26 to the shoulder 48 on one side of the connector and to a position immediately below or adjacent the distal end 46 of the second leg. In other words, the base 50 is separated from the distal end of the leg 44 by the narrow portion of the slot 40.

The shoulder 48 is inclined away from the base 50 in a direction outwardly from the base. In other words, the shoulder 48 is flared upwardly and outwardly from the base 50 and from the body portion 26. In a similar manner the distal end 46 of the second leg 44 is inclined or flared upwardly and outwardly in a direction away from both the base 50 and the body 26. Such a taper accommodates various different tolerances or thicknesses in the member 30.

Figure 2:
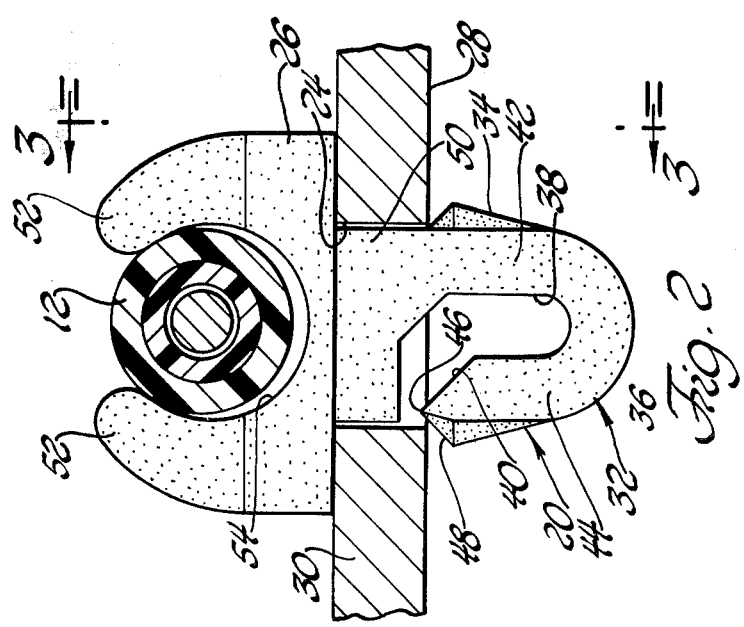
FIG. 2 is an enlarged view taken substantially along 2—2 of FIG. 1.
Figure 4:
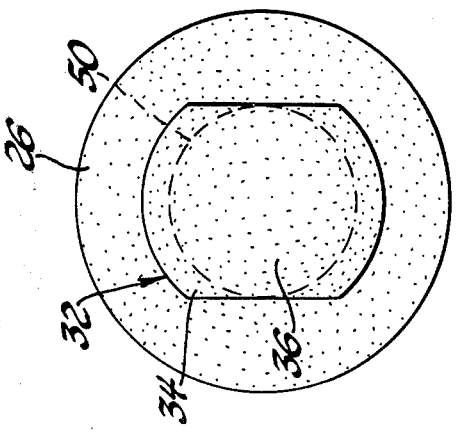
FIG. 4 is a view taken substantially along line 4—4 of FIG. 3.
Figure 3:
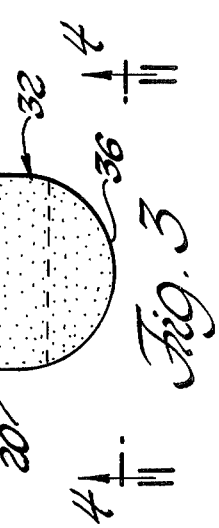
FIG. 3 is a view taken substantially along line 3—3 of FIG. 2.

As the snap-in connector 20 is inserted through the opening 24, the leg 44 is moved toward the leg 42; however, the leg 42 is relatively inflexible and therefore when the connector reaches the position for the base to be disposed withing the openings 24, the connector shifts laterally to the left, as viewed in FIG. 2. In other words, the outwardmost extremity of the shoulder 48 rides through the opening 24 as the leg 44 is flexed radially inwardly so its outermost point is inwardly of the circumference of the base 50 therebelow. Because of this feature, it is very difficult to remove the snap-in connector from the opening 24. If the leg 44 is moved toward the leg 42 in the position shown in FIG. 2, the connector still cannot be removed from the opening even if the leg 44 will clear the opening 24 as the shoulder 48 will not clear the opening and the connector cannot be shifted because of the base 50 substantially filling the opening 24. Furthermore, besides the importance of the base in preventing removal of the snap-in from the opening 24, the base is also important to provide a full shear section taking shear forces applied to the connector. As will be readily apparent, such shear forces can be very significant when the connector is attached to the core element 18 as are the connectors 20' and 20".

The snap-in connector 20 also includes attachment means for releasably attaching the connector 20 to the conduit 12. More specifically, the attachment means includes a pair of spaced arcuate arms 52 defining a circular cavity 54 which extends into the base 26 and in which the conduit 12 may be disposed. The arms 52 are flexible for allowing the conduit to be snapped into the cavity 54 and removed from the cavity whereby the snap-in connector 20 may be removed from the conduit 12. This feature is important in that there are many installations in which it is desired that the snap-in connector be retained in a hole or opening without being removed therefrom, yet supporting a conduit such as 12, which may be removed for maintenance or replacement purposes.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly comprising: a guide; a flexible motion transmitting core element movably supported by said guide for transmitting motion; and connection means for connecting one of said guide and said core element to support structure and control elements respectively, said connection means including an integral snap-in connector for snap-in retention in an opening and defined by a body for disposition on one side of the opening and a head for insertion through and retention in the opening, said head including a first leg extending outwardly from said body to an outward end and a second leg extending generally inwardly from said outward end of said first leg to a distal end thereof, said legs being spaced from one another, with said first leg being relatively inflexible in a direction toward said second leg, said first leg including a shoulder facing said body and in spaced relationship thereto, said distal end of said second leg being spaced from said body substantially the same distance as said shoulder, said shoulder and said distal end each being flared upwardly and outwardly in a direction away from said body.

2. An assembly as set forth in claim 1 including a base extending upwardly from said body to said shoulder on said first leg and to a position immediately adjacent said distal end of said second leg.

3. An assembly as set forth in claim 2 wherein the outer surfaces of said first and second legs form a part of a frusto cone.

4. An assembly as set forth in claim 3 wherein the outer surface of the connection between said legs is semi-spherical.

5. An assembly as set forth in claim 4 wherein said snap-in connector is attached to said core element for snap-in connection to a control element.

6. An assembly as set forth in claim 4 wherein said snap-in connector is attached to said guide.

7. An assembly as set forth in claim 6 wherein said snap-in connector includes attachment means releasably attaching said connector to said guide means.

8. An assembly as set forth in claim 7 wherein said attachment means includes a pair of spaced arcuate arms defining a cavity in which said guide is retained by said arms.

9. An assembly as set forth in claim 8 wherein said arms are flexible for allowing said guide to be removed from said cavity to remove said snap-in connector from said guide.

10. An integral snap-in connector for snap-in retention in an opening comprising: a body for disposition on one side of the opening and a head for insertion through and retention in the opening, said head including a first leg extending outwardly from said body to an outward end and a second leg extending generally inwardly from said outward end of said first leg to a distal end thereof, said legs being spaced from one another, with said first leg being relatively inflexible in a direction toward said second leg, said first leg having a shoulder facing said body and in spaced relationship thereto, said distal end of said second leg being spaced from said body substantially the same distance as said shoulder said shoulder and said distal end each being flared upwardly and outwardly in a direction away from said body.

11. A snap-in connector as set forth in claim 10 including a base extending upwardly from said body to said shoulder on said first leg and to a position immediately adjacent said distal end of said second leg.

12. An assembly as set forth in claim 11 including attachment means for releasably attaching said connector to another member.

13. An assembly set forth in claim 12 wherein said attachment means includes a pair of spaced arcuate arms defining a cavity for receiving the other member.

14. An assembly as set forth in claim 13 wherein said arms are flexible for allowing the member retained therebetween to be removed from said cavity to remove said connector from the member.

* * * * *